United States Patent
Bhowmik et al.

(10) Patent No.: US 12,289,660 B2
(45) Date of Patent: Apr. 29, 2025

(54) METHODS AND SYSTEMS FOR MANAGING TEMPERATURE OF 5G UE BY TX/RX PATH SWITCHING

(71) Applicant: Samsung Electronics Co., Ltd., Suwon-si (KR)

(72) Inventors: Samiran Bhowmik, Bangalore (IN); Kailash Kumar Jha, Bangalore (IN); Subbarayudu Mutya, Bangalore (IN); Jagadeesh Gurugubelli, Bangalore (IN); Nitesh Pushpak Shah, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 563 days.

(21) Appl. No.: 17/503,147

(22) Filed: Oct. 15, 2021

(65) Prior Publication Data

US 2022/0124598 A1   Apr. 21, 2022

Related U.S. Application Data

(63) Continuation of application No. PCT/KR2021/014418, filed on Oct. 15, 2021.

(30) Foreign Application Priority Data

Oct. 16, 2020  (IN) .............................. 202041045188
Oct. 8, 2021   (IN) .............................. 202041045188

(51) Int. Cl.
*H04W 40/18*   (2009.01)
*H04B 17/318*  (2015.01)
*H04W 24/10*   (2009.01)

(52) U.S. Cl.
CPC .......... *H04W 40/18* (2013.01); *H04B 17/318* (2015.01); *H04W 24/10* (2013.01)

(58) Field of Classification Search
CPC ...... H04B 17/13; H04B 17/14; H04B 17/318; H04B 17/327; H04W 24/10;
(Continued)

(56) References Cited

U.S. PATENT DOCUMENTS

2014/0199952 A1 *  7/2014  Sandhu .................. H04B 17/13
                                                        455/91
2016/0360462 A1 * 12/2016  Chockalingam .. H04W 36/0058
(Continued)

FOREIGN PATENT DOCUMENTS

CN    101753658 A    6/2010
CN    102176782 A    9/2011
(Continued)

OTHER PUBLICATIONS

Examination report dated Nov. 16, 2023, in connection with Indian Application No. 202041045188, 6 pages.
(Continued)

*Primary Examiner* — Michael Thier
*Assistant Examiner* — Prince A Mensah

(57) ABSTRACT

Methods and systems for managing temperature of 5G UE by TX/RX path switching. If temperature of the UE increases beyond a preconfigured threshold due to heat contributed by a first TX/RX path of the UE, embodiments perform switching from the first TX/RX path to a second TX/RX path to control the temperature of the UE. The first TX/RX path and the second TX/RX path correspond to the same or different RF bands. If the first TX/RX path and the second TX/RX path correspond to different RF bands, the UE sends, to a wireless network, either: a measurement report, indicating that RSRP of a cell corresponding to the second TX/RX path is greater than RSRP of the serving cell corresponding to the first TX/RX path; or a UE Assistance
(Continued)

Information indicating that the UE intends to camp on the cell corresponding to the second TX/RX path of the UE.

19 Claims, 5 Drawing Sheets

(58) Field of Classification Search
 CPC ....... H04W 36/0058; H04W 36/00835; H04W 48/18; H04W 40/18
 See application file for complete search history.

(56) References Cited

U.S. PATENT DOCUMENTS

| | | | |
|---|---|---|---|
| 2019/0327655 A1* | 10/2019 | Lee | H04W 36/0058 |
| 2020/0220572 A1* | 7/2020 | Kwon | H04M 1/026 |
| 2020/0305015 A1* | 9/2020 | Yang | H04W 36/00835 |
| 2023/0180072 A1* | 6/2023 | Ranjan | H04W 48/18 |
| | | | 455/436 |

FOREIGN PATENT DOCUMENTS

| | | |
|---|---|---|
| CN | 102186227 A | 9/2011 |
| CN | 111757477 A | 10/2020 |
| EP | 3627899 A1 | 3/2020 |

OTHER PUBLICATIONS

International Search Report and Written Opinion of the International Searching Authority dated Jan. 21, 2022, in connection with International Application No. PCT/KR2021/014418, 7 pages.
3GPP TS 38.331 V16.2.0 (Sep. 2020), Technical Specification, 3rd Generation Partnership Project; Technical Specification Group Radio Access Network; NR; Radio Resource Control (RRC) protocol specification (Release 16), Sep. 2020, 922 pages.
CATT, "Further correction on UEAssistanceInformation upon reconfiguration with sync," R2-2006986, 3GPP TSG-RAN WG2 Meeting #111 electronic, Online, Aug. 17-28, 2020, 7 pages.
Huawei, et al., "Correction on UE assistance information transmission for handover case," R2-2007794, 3GPP TSG-RAN2 Meeting #111 electronic, Online, Aug. 17-28, 2020, 8 pages.

* cited by examiner

METHODS AND SYSTEMS FOR MANAGING TEMPERATURE OF 5G UE BY TX/RX PATH SWITCHING

CROSS-REFERENCE TO RELATED APPLICATIONS

This application is a continuation application, claiming priority under § 365(c), of an International Application No. PCT/KR2021/014418, filed on Oct. 15, 2021, which was based on and claimed the benefit of an Indian Provisional Application 202041045188, filed on Oct. 16, 2020, and an Indian Complete Application 202041045188, filed on Oct. 8, 2021, in the Indian Intellectual Property Office, the disclosures of each of which are incorporated by reference herein in its entirety.

BACKGROUND

1. Field

Embodiments herein relate to temperature management of 5th generation (5G) user equipment (UE), and more particularly to methods and systems for preventing thermal overloading in a 5G UE through efficient switching across transmitter/receiver paths.

2. Description of Related Art

5th generation systems (5GS) are capable of providing a higher throughput at a lower latency. Hence, a 5G user equipment (UE) is likely to transfer, through downlink (DL) and uplink (UL), a large amount of data. The data transfer causes the temperature of the 5G UE to increase rapidly within short time duration. The 5G UE is generally designed to be operated within a prescribed temperature limit (typically less than 85 degree Celsius). When the temperature of the 5G UE crosses this prescribed limit, temperature mitigation schemes, configured in the 5G UE, can be activated. The activation of the temperature mitigation schemes can be prompt as prevention of thermal overloading and management of device temperature is critical in 5G devices, since temperature of the 5G devices can rise quickly owing to the transfer of large amounts of UL/DL data.

The source(s) causing the increase in the temperature are transmitter (TX) and/or receiver (RX) paths of the 5G UE. Each TX path and each RX path includes a power amplifier. When there is a high throughput, or when DL and/UL speeds are high, power amplifiers in the TX path and/or RX path are likely to get heated. When the power amplifiers of the TX and/or RX paths get heated, the heat can spread to other components of the 5G UE. The spreading of heat can result in system wide overheating, which in turn leads to the increase in the temperature of the 5G UE.

Currently, chipset manufacturers employ various means (solutions) to handle the temperature rise due to 5G usage. While some solutions throttle the DL/UL speed by reducing the rank and the number of carrier components, trigger fall back from 5G to long term evolution (LTE), other solutions may disable 5G as a means to control the temperature of the 5G UE. These solutions may not be desirable for the user as these solutions either interrupt reception of 5G services or degrade 5G quality of service (QoS).

FIG. 1 illustrates a flow diagram for a stage wise activation of temperature mitigating mechanisms in a 5G UE due to increase in temperature of the 5G UE. As depicted in FIG. 1, the first stage can be considered as normal stage, wherein the temperature of the 5G UE is less than a preconfigured threshold temperature. At the first stage, the temperature mitigating mechanism is not activated. The rank is 2 and number of carrier components (CC) is 8. When the temperature of the 5G UE increases beyond the preconfigured threshold temperature, a warning is issued and a timer is activated. This can be considered as second stage. At the second stage, the rank remains 2 and the number of allowed CC remain 8.

The temperature mitigating mechanism can monitor the 5G UE temperature and the timer. If the 5G UE temperature (currently greater than the preconfigured threshold temperature) continues to increase, while the timer has not expired, the third stage is activated. Herein, the rank is reduced to 1 (from 2) and the number of allowed CC is reduced to 2 (from 8). On the other hand, if the 5G UE temperature (currently greater than the preconfigured threshold temperature) continues to increase even after the expiry of the timer, the fourth stage is activated. In the fourth stage, fall back from 5G to LTE (disabling 5G) can be triggered.

If the third stage is activated (the 5G UE temperature increases while the timer is running), the timer is restarted and the 5G UE temperature is monitored. If the timer expires while the 5G UE temperature keeps increasing, the fourth stage can be activated. In the third stage and fourth stage, UL and/or DL speeds can be throttled. Further, in the fourth stage, 5G services are interrupted.

The principal object of the embodiments herein is to disclose methods and systems for controlling the temperature of a 5th generation (5G) user equipment (UE), if the temperature of the UE is contributed by overheating of at least one of transmitter (TX) path and receiver (RX) path of the 5G UE.

Another object of the embodiments herein is to enable switching across TX paths and/or RX paths of the UE within the same radio frequency (RF) band or across different RF bands, to receive 5G services, to control the temperature of the 5G UE.

SUMMARY

Accordingly, the embodiments provide methods and systems for manage the temperature of the user equipment (UE), if the temperature of the UE increases beyond a preconfigured threshold due to heat contributed by transmitter (TX) and/or receiver (RX) paths of the UE. The embodiments include detecting that a first TX path of the UE and/or a first RX path of the UE are contributing to the temperature of the UE. In an embodiment, the detection of the first TX path of the UE and/or the first RX path of the UE contributing to the temperature of the UE is triggered if the temperature of the UE is greater than a predefined temperature threshold. The embodiments include performing at least one of a switching from the first TX path of the UE to a detected second TX path of the UE, and a switching from the first RX path of the UE to a detected second RX path of the UE, on determining that the first TX path of the UE and/or the first RX path of the UE is contributing to increase in the temperature of the UE. In an embodiment, the first TX/RX path of the UE and the detected second TX/RX path of the UE are part of either same radio frequency (RF) band or different RF bands.

In an embodiment, if the first TX/RX path of the UE and the detected second TX/RX path of the UE are part of different frequency bands, the UE performs an action comprising either sending a modified measurement report, to a wireless network, indicating that a received signal strength from a cell, hosting a frequency band corresponding to the detected second TX/RX path of the UE, is greater than a received signal strength from a serving cell hosting a frequency band corresponding to first TX/RX path of the UE; or sending a modified UE Assistance Information message, to the wireless network, indicating that the intends to camp on the cell hosting the frequency band corresponding to the detected second TX/RX path of the UE. The switching from the first TX/RX path of the UE to the detected second TX/RX path of the UE is successful if a handover procedure, initiated by the wireless network in response to one of the modified measurement report and the modified UE Assistance Information message, is successful.

In an embodiment, the cell, hosting the frequency band corresponding to the detected second TX/RX path of the UE, is selected, from among a plurality of cells based on priority associated with each of the plurality of cells. The cells can be a new radio (NR) standalone (SA) cell, a NR non-SA (NSA) cell, a long term evolution (LTE) cell, or the serving cell. The priority assigned to the SA cell is highest, the priority assigned to the NSA cell is second highest, the priority assigned to the LTE cell is third highest, and the priority assigned to the serving cell is lowest. The SA cell can support sub-6 GHz frequencies, and amongst the sub-6 GHz frequencies, priority of a SA cell supporting ultra-higher band (UHB) frequencies is the highest, priority of a SA cell supporting higher band (HB) frequencies is second highest, priority of a SA cell supporting mid-band (MB) frequencies is third highest, priority of a SA cell supporting mid-lower band (MLB) frequencies is fourth highest, and priority of a SA cell supporting lower band (LB) frequencies is the lowest.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

Figure 1:
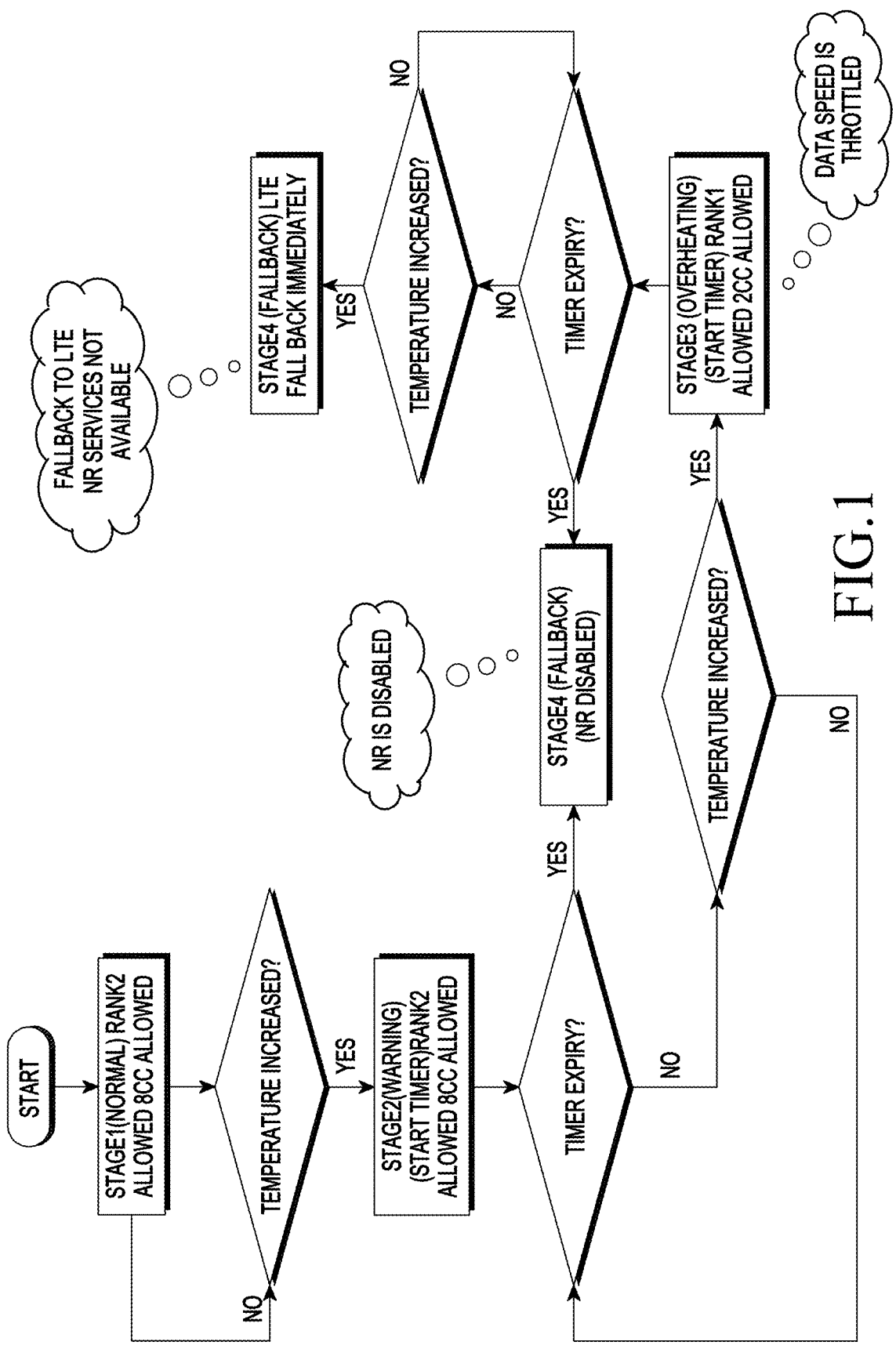
FIG. 1 illustrates a flow diagram for a stage wise activation of temperature mitigating mechanisms in a 5th generation (5G) user equipment (UE) due to increase in temperature of the 5G UE.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for controlling the temperature of a 5th generation (5G) user equipment (UE) if the temperature of the 5G UE increases beyond a preconfigured threshold, wherein the increase in the temperature can be contributed by transmitter (TX) and/or receiver (RX) paths of the 5G UE. Referring now to the drawings, and more particularly to FIGS. 2 through 5, where similar reference characters denote corresponding features consistently throughout the figures, there are shown preferred embodiments.

Figure 2:
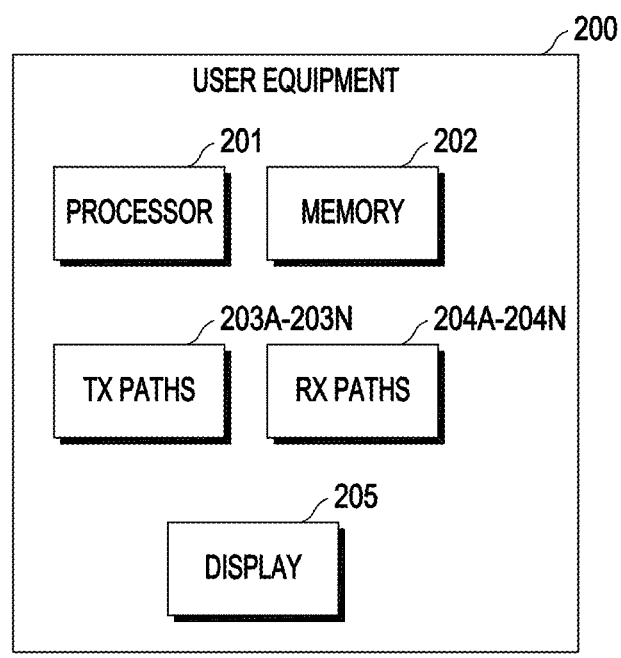
FIG. 2 illustrates various units of a UE configured to manage the temperature of the UE when the temperature of the UE increases beyond a preconfigured threshold due to heat contributed by transmitter (TX) and/or receiver (RX) paths of the UE according to embodiments as disclosed herein.

FIG. 2 illustrates various units of a UE 200 configured to manage the temperature of the UE 200 if the temperature of the UE 200 increases beyond a preconfigured threshold due to heat contributed by TX and/or RX paths of the UE 200 according to embodiments as disclosed herein. As depicted in FIG. 2, the UE 200 includes a processor 201, memory 202, a plurality of TX paths 203 A-203 N, a plurality of RX paths 204 A-204 N, and a display 205. The UE 200 is a 5G UE and is capable of providing 5G services.

The UE 200 is configured to monitor the temperature of the UE 200. If the UE 200 detects that the temperature of the UE 200 is greater than a predefined temperature threshold, the UE 200 is configured to determine whether the temperature of the UE 200 is contributed due to the heating of one or more TX paths and/or one or more RX paths, through which the UE 200 is availing 5G services. In an embodiment, the UE 200 can detect that the temperature of the UE 200 is contributed to by the current TX path based on at least one of a uplink (UL) throughput, an UL buffer status, and a UL transmitted power. Similarly, the UE 200 can detect that the temperature of the UE 200 is contributed to by the current RX path based on at least one of a downlink (DL) throughput, a DL buffer status, a DL transmitted power, and number of DL retransmissions. In an embodiment, the UE 200 can determine the UL throughput, the UL buffer status, the UL transmitted power, the DL throughput, the DL buffer status, the DL transmitted power, and the number of DL retransmissions, using supervised learning.

In an example, amount of TX power used by the UE 200 to transmit data in UL increases as the UE 200 moves towards the edge of the serving cell. If the UE 200 continuously transmits high volume of UL data at a high TX power from the edge of the serving cell, the possibility of overheating may increase. This can cause throttling of UL throughput, TX power reduction, or disabling of NR. The UE 200 can perform supervised learning, whereby the UE 200 can analyze the amount of TX power used by the UE 200 and the volume of transmitted UL data, to predict possibilities of overheating of the TX path. Based on the analysis, the UE 200 can predict the possibility of increase in the temperature of the UE 200 due to overheating of the TX path if the UE 200 transmits high volume of UL data at a high TX power.

In an example, if the volume of DL data received by the UE 200 is high for a considerable period for time, there may be a possibility of overheating of currently used RX path. Further, if there is lower layer failure, DL retransmissions increases. This leads to an increased usage of the RX path, and, consequently, the possibility of overheating of the currently used RX path increases. The UE 200 can perform supervised learning, whereby the UE 200 can learn the pattern of increase in the volume of DL data received by the UE 200 and increase in the DL retransmissions. The UE 200 can predict the possibility of increase in the temperature of the UE 200 is due to overheating of the RX path.

If the UE 200 determines that the temperature of the UE 200 is contributed by the one or more TX paths due to overheating of power amplifiers in the one or more TX paths, and/or by the one or more RX paths due to overheating of power amplifiers in the one or more RX paths, the UE 200 may attempt to change Radio Frequency (RF) frequency band for TX and/or RF frequency band for RX. The change in the RF frequency band allows changing the overheated one or more TX paths and/or overheated one or more RX paths contributing to the temperature of the UE 200, and bringing the temperature of the UE 200 under control.

The UE 200 can internally change from an overheated TX path to a new TX path, if the overheated TX path and the new TX path are part of same RF band. Similarly, the UE 200 can internally change from an overheated RX path a new RX path if the overheated RX path and the new RX path are part of same RF band. In this scenario, the UE 200 remains camped on the serving cell. However, if changing from the overheated TX path to the new TX path and/or changing from the overheated RX path to the new RX path necessitates changing the RF band, a handover procedure is involved. The UE 200 may be connected to a 5G network having multiple RF bands overlapping in a same (spatial) region, and there can also be different UE configurations (such as non-standalone (NSA) or standalone (SA)) based on the RF bands or radio access technology (RAT). The UE 200 can camp on NSA/SA cells hosting RF bands that are different from the RF band corresponding to the overheated TX/RX path. The availability of different RF bands and configurations allow the UE 200 to camp on the NSA/SA cells of different RF bands or cells of other RAT. The UE 200 camping on the NSA/SA cells or cells of other RAT allows changing the TX path and/or RX path, and ensures that TX path and/or RX path used by the UE 200, for availing 5G services, is different from the overheated TX path and/or RX path.

If a change in the TX path and/or RX path requires changing the RF band, the UE 200 may prioritize camping on 5G SA cells over NSA cells. Amongst the SA cells, or within a SA cell, priority of ultra-higher band (UHB) frequencies is highest, followed by higher band (HB) frequencies, mid-band (MB) frequencies, mid-lower band (MLB) frequencies, and lower band (LB) frequencies.

When the UE 200 intends to change current TX path and/or current RX path, due to overheating in the current TX path and/or current RX path, and if the UE 200 is not able to change to another TX path and/or another RX path in the same RF band (corresponding to the current TX path and/or current RX path); the UE 200 may scan neighbouring cells, hosting other RF bands, and camp on those neighbouring cells to change the current TX path and/or the current RX path. In an embodiment, when the UE 200 is able to detect a cell, the UE 200 may send a modified measurement report to the 5G network. The modified measurement report can indicate that received signal strength from the detected cell is greater than received signal strength from the serving cell.

In another embodiment, when the UE 200 is able to detect a cell, the UE 200 can send a modified UE assistance information message to the 5G network. The modified UE assistance information message may indicate that the UE 200 intends to camp on the detected cell. It can be noted that the received signal strength from the detected cell is greater than the predefined threshold strength. If the UE 200 is able to camp on the detected cell, the current TX path and/or the current RX path can be changed and the temperature of the UE 200 can be controlled.

In an embodiment, during cell detection, the order of priority for cell selection by the UE 200 is: SA cell>NSA cell>LTE cell>serving cell. Thus, the UE 200 prioritizes SA cells over NSA cells, LTE cells, and the serving cell; prioritizes NSA cells over the LTE cells and the serving cell, if SA cells are not available; and prioritizes LTE cells over the serving cell, if SA cells and NSA cells are not available. The priority of the serving cell is lowest as the UE 200 is not able to change the current TX path and/or current RX path in the serving cell. Amongst the detected SA cells (sub-6 GHz frequency) or within a SA cell, the order of priority for frequency band selection by the UE 200 is: UHB>HB>MB>MLB>LB.

As stated earlier, once the UE 200 detects the cell and sends the modified measurement report or the modified UE Assistance Information message, the UE 200 is able to change the current TX path and/or current RX path, if a handover operation to the detected cell is successful. The detected cell is of highest priority. If the handover operation to the detected cell of the highest priority is not successful, the UE 200 can send another modified measurement report, indicating that received signal strength from a cell having second highest priority is greater than received signal strength from the serving cell; or the UE 200 can send another modified UE Assistance Information message, indicating that the UE 200 intends to camp on the cell having the second highest priority.

Table 1 shows an example scenario, wherein the UE 200 is camped in a SA new radio (NR) cell. The temperature of the UE 200 is higher than the predefined temperature threshold. The (power amplifier) in the RX path (RX-1) is overheated and is contributing to the temperature of the UE 200.

TABLE 1

| Cell | LTE/NR | Cell ID | Band | Anchor | SA/NSA | RF Path |
|---|---|---|---|---|---|---|
| Serving Cell | NR | 1 | n25 | NA | SA | RX-1 |

Table 2 shows the cells that have been detected by the UE 200. The UE 200 has not been able to change the RX path (RX-1) within a RF band (which also includes the RX path (RX-1)). Therefore, the UE 200 attempts to change the RF band by detecting cells, with the intention of camping on one of the detected cells to change the RX path.

TABLE 2

| Sl. No. | LTE/NR | Cell ID | Band | Anchor | SA/NSA | RF Path |
|---|---|---|---|---|---|---|
| 1 | NR | 2 | n77 | NA | SA | RX-3 |
| 2 | LTE | 3 | Band 12 | NO | N/A | LTE (RX-0) |
| 3 | LTE | 4 | Band 1 | YES | N/A | LTE (RX-0) + NR (RX-2) |
| 4 | NR | 5 | n25 | NA | S/A | RX-1 |
| 5 | NR | 6 | n41 | NA | SA | RX-2 |

Table 3 shows the sorting of the detected cells by the UE 200 based on the priorities associated with the detected cells.

TABLE 3

| Sl. No. | LTE/NR | Cell ID | Band | Anchor | SA/NSA | RF Path |
|---|---|---|---|---|---|---|
| 1 | NR | 5 | N41 | NA | SA | RX-2 |
| 2 | NR | 2 | N77 | NA | SA | RX-3 |
| 3 | LTE | 4 | Band 1 | YES | N/A | LTE (RX-0) + NR (RX-2) |
| 4 | LTE | 3 | Band 12 | NO | N/A | LTE (RX-0) |
| 5 | NR | 6 | n25 | NA | SA | RX-1 |

As depicted in Table 3, the NR cell (having cell ID 6) corresponding to the overheated RX path (RX-1) is having the least priority as the UE 200 does not intend to camp on the NR cell that corresponds to the overheated RX path (RX-1). As NR cells are having greater priority over the LTE cells, the NR cell with cell ID 5 corresponding to the RX path (RX-2), and the NR cell with cell ID 2 corresponding to the RX path (RX-3), are the preferred candidates of the detected cell for the UE 200.

Table 4 shows an example scenario, wherein the UE 200 is camped in Band 1 of LTE cell with cell ID 1. The UE 200 is also camped on an Evolved universal mobile telecommunication system terrestrial radio access network new radio dual connectivity (ENDC) cell for receiving NR service in NSA mode in the LTE cell. The temperature of the UE 200 is detected to be greater than the predefined temperature threshold. The (power amplifier) in the RX path (RX-1) is overheated and is contributing to the temperature of the UE 200.

TABLE 4

| Cell | LTE/NR | Cell ID | Band | Anchor | SA/NSA | RF Path |
|---|---|---|---|---|---|---|
| Anchor Cell | LTE | 1 | Band 1 | YES | NSA | RX-0 |
| ENDC cell | NR | 2 | n77 | NA | NSA | RX-1 |

Table 5 shows the cells that have been detected by the UE 200. The UE 200 has not been able to change the RX path (RX-1) within a RF band (which also includes the RX path (RX-1)). Therefore, the UE 200 attempts to change the RF band by detecting cells, with the intention of camping on one of the detected cells to change the RX path.

TABLE 5

| Sl. No. | LTE/NR | Cell ID | Band | Anchor | SA/NSA | RF Path |
|---|---|---|---|---|---|---|
| 1 | NR | 2 | n79 | NA | SA | RX-3 |
| 2 | NR | 3 | n78 | NA | NSA | RX-1 |
| 3 | LTE | 4 | Band 12 | NO | N/A | LTE (RX-1) |
| 4 | LTE | 5 | Band 1 | YES | N/A | LTE (RX-0) + NR (RX-2) |
| 6 | NR | 6 | n25 | NA | SA | RX-1 |
| 6 | NR | 7 | n41 | NA | SA | RX-2 |

Table 6 shows the sorting of the detected cells by the UE 200 based on the priorities associated with the detected cells.

TABLE 6

| Sl. No. | LTE/NR | Cell ID | Band | Anchor | SA/NSA | RF Path |
|---|---|---|---|---|---|---|
| 1 | NR | 7 | n41 | NA | SA | RX-2 |
| 2 | NR | 2 | n79 | NA | SA | RX-3 |

TABLE 6-continued

| Sl. No. | LTE/NR | Cell ID | Band | Anchor | SA/NSA | RF Path |
|---|---|---|---|---|---|---|
| 3 | LTE | 5 | Band 1 | NO | N/A | LTE (RX-0) + NR(RX-2) |
| 4 | LTE | 4 | Band 12 | NO | N/A | LTE (RX-1) |
| 5 | NR | 6 | n25 | NA | SA | RX-1 |
| 6 | NR | 3 | n78 | NSA | NSA | RX-1 |

As depicted in Table 6, the NR cells (having cell ID 6 and cell ID 3) corresponding to the overheated RX path (RX-1) is having the least priority, as the UE 200 does not intend to camp on the NR cells that corresponds to the overheated RX path (RX-1). As NR cells are having greater priority over the LTE cells, the NR cell with cell ID 7 corresponding to the RX path (RX-2) and the NR cell with cell ID 2 corresponding to the RX paths (RX-3) are the preferred candidates of the detected cell for the UE 200.

In an embodiment, if the detected cell is an NSA cell, modified measurement report sent by the UE 200 is a B-1 measurement report. The received signal strength from the NSA cell is indicated to be greater than the received signal strength from the serving cell, wherein the received signal strength from the serving cell, as indicated in the modified measurement report, is less than actual received signal strength from the serving cell. This is because the UE 200 intends the handover operation to take place and the UE 200 does not prefer (lowest priority) to remain camped on the serving cell (as the TX/RX path corresponding to the RF band in the serving cell is causing the temperature of the UE 200 to increase).

In an embodiment, the UE 200 can refrain from sending measurement reports of cells hosting RF bands that are corresponding to the overheated TX path and/or overheated RX path. Thus, the 5G network does not handover the UE 200 to those cells hosting the RF bands corresponding to the overheated TX path and/or overheated RX path. In an embodiment, the UE 200 may maintain a local database to store the NSA cells and the SA cells. This allows faster cell detection.

FIG. 2 shows exemplary units of the UE 200, but it is to be understood that other embodiments are not limited thereon. In other embodiments, the UE 200 may include less or more number of units. Further, the labels or names of the units of the UE 200 are used only for illustrative purpose and does not limit the scope of the present disclosure. One or more units can be combined together to perform same or substantially similar function in the UE 200.

Figure 3:
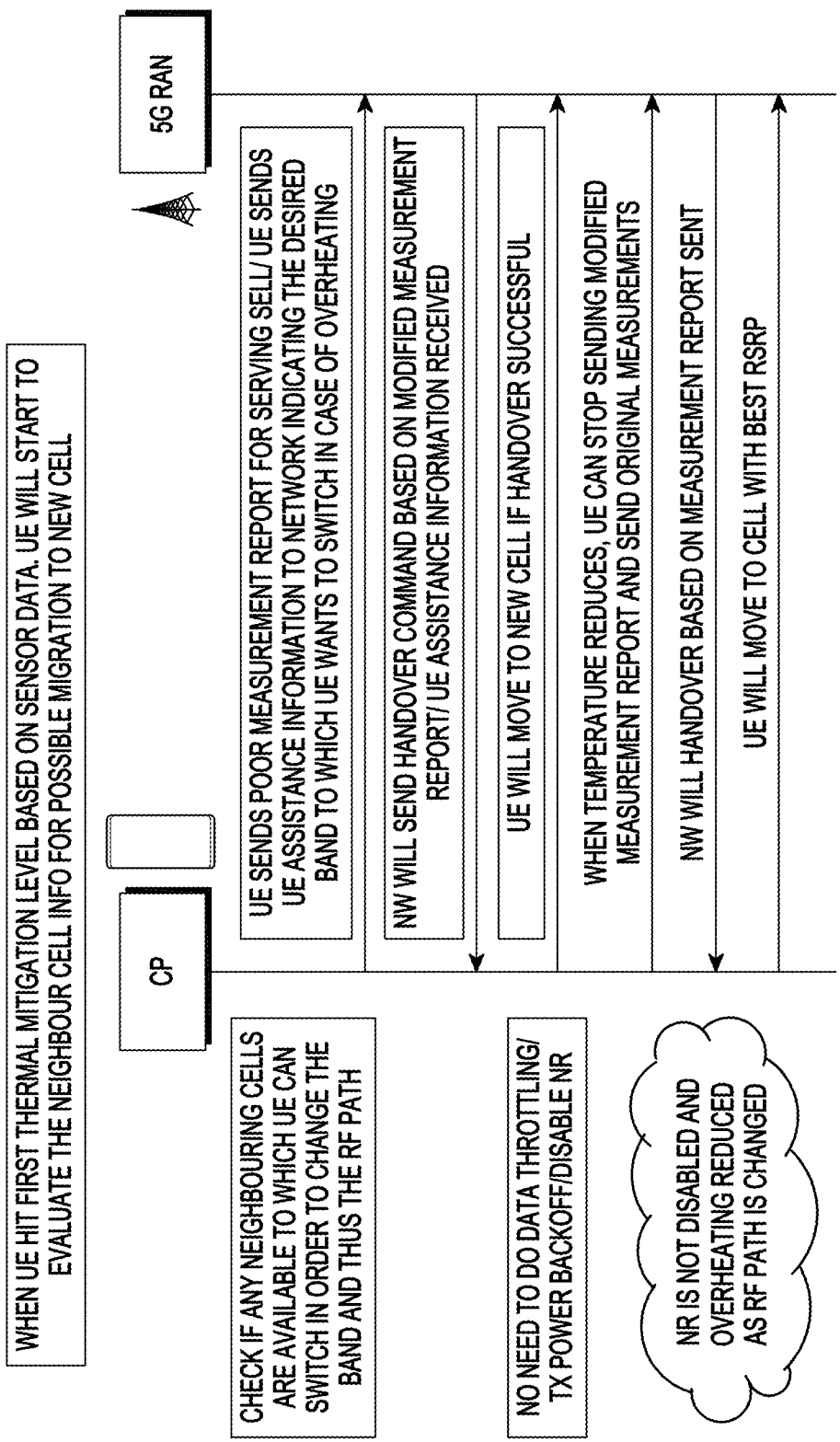
FIG. 3 illustrates a sequence diagram for management of temperature of the UE through handover to a neighboring cell leading to change in current TX path and/or RX path of the UE according to embodiments as disclosed herein.

FIG. 3 illustrates a sequence diagram for management of temperature of the UE 200 through handover to a neighboring cell leading to change in current TX path and/or RX path of the UE 200 according to embodiments as disclosed herein. Consider that the UE 200 is availing 5G services by camping on an ENDC NSA NR cell or a SA NR cell of the 5G network. The UE 200 is availing the 5G services through a RF band corresponding to a TX path and/or a RX path. The UE 200 can detect, using temperature sensors, that the temperature of the UE 200 had crossed a level necessitating thermal mitigation. Consider that the UE 200 is not able to change the TX path and/or the RX path within the RF band. Therefore, the UE 200 attempts to change the RF band, which may result in change in the current TX path and/or the RX path, by camping on a neighboring cell, i.e., a NR cell (NSA/SA configuration) or a cell of a different RAT (such as LTE cell). The UE 200 can initiate neighboring cell detection and sort the detected cells based on priorities associated with the detected cells. In an embodiment, the order of priority of the neighboring cells is UHB SA cell>HB SA cell>MB SA cell>MLB SA cell>LB SA cell>NSA cell>LTE cell>serving cell or cell corresponding to the current (overheated) TX path and/or the current (overheated) RX path.

In an embodiment, the UE 200 can send a modified measurement report to the 5G network, in which it is indicated that received signal strength from the serving cell is low (lowest), and received signal strength from a detected cell, having the highest priority, is high (greatest). In another embodiment, the UE 200 may send UE assistance information to the 5G network, which indicates that that the UE 200 intends to switch to a RF band hosted by the detected cell having the highest priority.

The 5G network can send a handover command to the UE 200 based on the received modified measurement report or the received UE assistance information. On receiving the handover command, the UE 200 may camp on the detected cell having the highest priority. If the 5G network does not send the handover command or if the handover is not successful, the UE 200 can send another modified measurement report to the 5G network, in which it is indicated that received signal strength from a detected cell, having the second highest priority, is greatest; or the UE 200 may send UE assistance information to the 5G network, which indicates that that the UE 200 intends to switch to a RF band hosted by the detected cell having the second highest priority. This can continue till the UE is able to camp on a cell hosting a RF band that corresponds to a different TX path and/or RX path.

Once the UE 200 is able to camp on a high priority detected cell, the TX path and/or RX path is modified. The UE 200 can avail the 5G services through a new TX path and/or a new RX path. Thus, the temperature of the UE 200 is brought under control without the need of disabling NR (if the UE 200 is able to camp on a NR SA cell or a NSA NR cell), throttling UL speed (due to overheating in the TX path) and/or DL speed due to overheating in the RX path), or TX power back-off.

When the temperature of the UE 200 reduces, the UE 200 may send measurement reports indicating actual strength of all neighboring cells of the UE 200. The 5G network may initiate a handover procedure, wherein the UE 200 is likely to camp on a cell with the best reference signal received power (RSRP).

Figure 4:
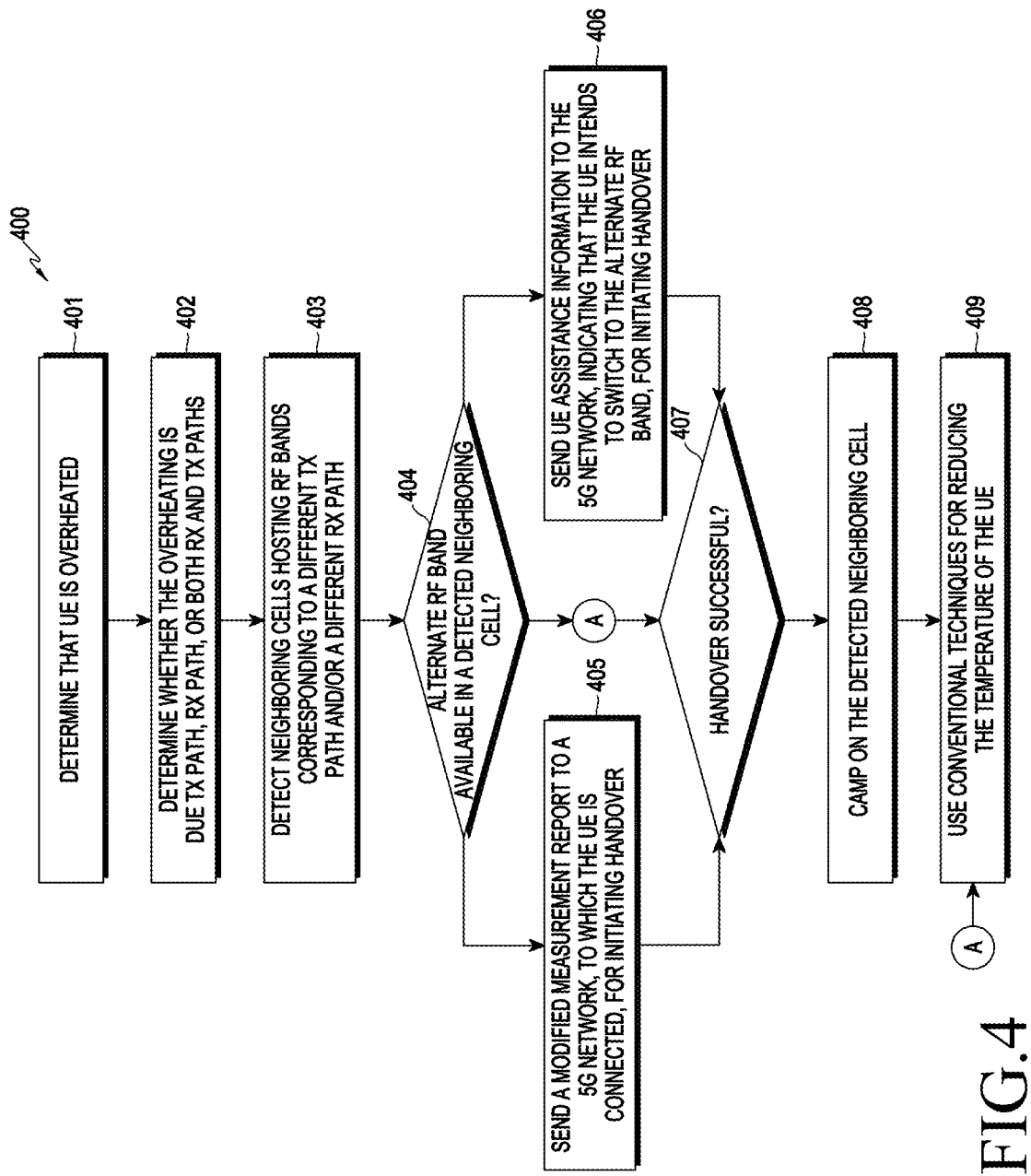
FIG. 4 illustrates a flowchart of a method for managing the temperature of the UE due to overheating of TX and/or RX paths of the UE according to embodiments as disclosed herein.

FIG. 4 illustrates a flowchart 400 of a method for managing the temperature of the UE 200 due to overheating of TX and/or RX paths of the UE 200, according to embodiments as disclosed herein. At step 401, the method includes determining the UE 200 is overheated. The UE 200 is availing the 5G services, which involves receiving DL data through a RX path corresponding to a TX RF band, and transmitting UL data through a TX path corresponding to a RX RF band. At step 402, the method includes determining whether the overheating is caused due the TX path, RX path, or both RX and TX paths. Consider that the UE 200 is not able to change the TX path and/or the RX path within the TX RF band and/or the RX RF band. Therefore, at step 403, the method includes detecting neighboring cells hosting RF bands corresponding to a different TX path and/or a different RX path. The UE 200 can camp on a neighboring NSA NR cell, a neighboring SA NR cell, or an LTE cell. The UE 200 can initiate neighboring cell detection and sort the detected cells based on priorities associated with the detected cells.

At step 404, the method includes determining whether an alternate RF band is available, which results in change in the TX path and/or the RX path. The UE 200 can determine the availability of the alternate RF band by determining a neighboring cell. The UE 200 may detect a plurality of neighboring cells, and sort the detected neighboring cells based on predefined priorities (order of priority: UHB SA cell>HB SA cell>MB SA cell>MLB SA cell>LB SA cell>NSA cell>LTE cell>serving cell or cell corresponding to the current (overheated) TX path and/or the RX path). The alternate RF band is hosted by one or more of the detected neighboring cells. If the UE 200 is able to switch to the alternate RF band, hosted by one or more of the detected neighboring cells, the UE 200 can change the (overheated) TX path and/or the (overheated) RX path to a new TX path and/or a new RX path.

In an embodiment, at step 405, the method includes sending a modified measurement report to a 5G network, to which the UE 200 is connected, on determining that the alternate RF band is available. The modified measurement report can indicate that a RSRP corresponding to the serving cell (hosting the overheated TX path and/or the overheated RX path) is lower than the actual RSRP, and a RSRP corresponding to a detected neighboring cell, hosting the alternate RF band, is high. In another embodiment, at step 406, the method includes sending UE assistance information to the 5G network, which indicates that the UE 200 intends to switch to the alternate RF band hosted by the detected neighboring cell. It is to be noted that the detected neighboring cell is having the highest priority, when the UE 200 sends the modified measurement report or the UE assistance information to the 5G network for the first time.

At step 407, the method includes determining whether a handover to the detected neighboring cell hosting the alternate RF band is successful. The 5G network can send a handover command to the UE 200 based on the received modified measurement report or the received UE assistance information. If the UE 200 is able to camp on the detected neighboring cell, the handover is considered successful. At step 408, the method includes enabling the UE 200 to camp on the detected neighboring cell. Once the UE 200 is able to camp on a high priority cell, the TX path and/or RX path is changed. Thereafter, the UE 200 is able to avail the 5G services through a new TX path and/or a new RX path. Thus, the temperature of the UE 200 is brought under control.

On the other hand, if it is determined (at step 404) that the alternate RF band is not available or if it is determined (at step 407) the handover is not successful, the UE 200 uses, at step 409, conventional techniques for reducing the temperature of the UE 200.

The various actions in the flowchart 400 may be performed in the order presented, in a different order, or simultaneously. Further, in some embodiments, some actions listed in FIG. 4 may be omitted.

Figure 5:
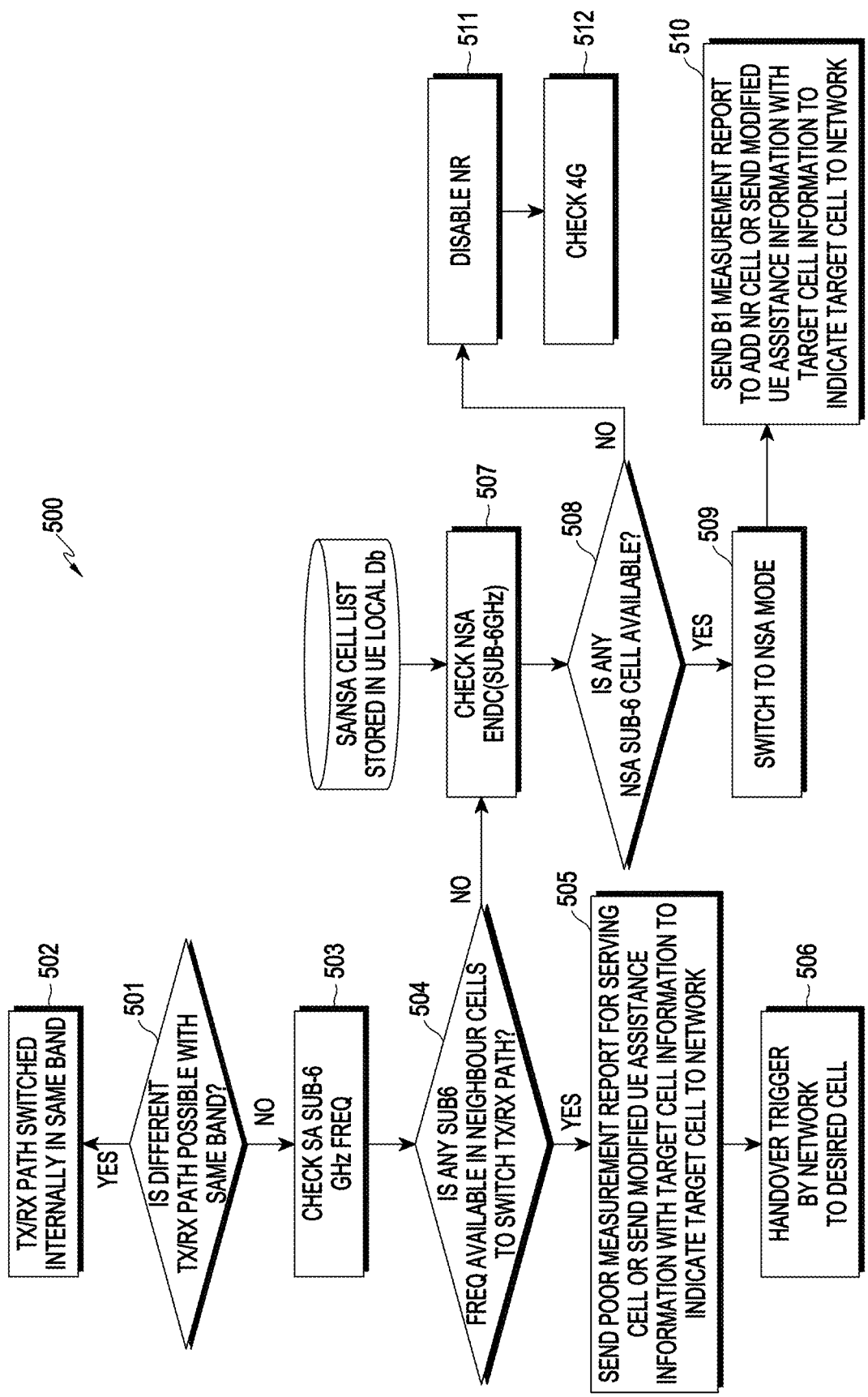
FIG. 5 illustrates a flowchart detecting a method for selecting a suitable RF band to avail 5G services using a TX path and/or a RX path that keeps the temperature of the UE under control according to embodiments as disclosed herein.

FIG. 5 illustrates a flowchart 500 for detecting a method for selecting a suitable RF band to avail 5G services using a TX path and/or a RX path that keeps the temperature of the UE 200 under control, according to embodiments as disclosed herein. At step 501, the method includes determining whether the UE 200 is able to switch a current TX path and/or current RX path in a current RF band. The UE 200 may attempt to switch to a new TX path from the current TX path and/or switch to a new RX path from the current RX path in the current RF band. The UE 200 may attempt to switch to the new TX path and/or the new RX path, if the current TX path and/or the current RX path are overheated. If the UE 200 is able to switch to the new TX path and/or the new RX path in the current RF band, the method includes, at step 502, internally switching to the new TX path and/or the new RX path. This can reduce the temperature of the UE 200 contributed by the current TX path (now switched) and/or the current RX path (now switched).

If the UE 200 is not able to switch to the new TX path and/or the new RX path in the current RF band, the method includes, at step 503, detecting a neighboring NR SA cell supporting sub-6 GHz frequencies. At step 504, the method includes determining whether a neighboring NR SA cell supporting sub-6 GHz frequencies is available. If the UE 200 is able to detect, at step 505, a neighboring NR SA cell supporting sub-6 GHz frequencies, the UE 200 can camp on the NR SA cell and avail 5G services using a sub-6 GHz band through a new TX path and/or a new RX path. In an embodiment, the UE 200 may send a modified measurement report to a 5G network, to which the UE 200 is connected, indicating that RSRP corresponding to the serving cell, hosting the overheated TX path and/or the overheated RX path, is lower than the actual RSRP. Further, the modified measurement report can indicate that RSRP corresponding to the NR SA cell supporting sub-6 GHz frequencies is high. In another embodiment, the UE 200 may send UE assistance information to the 5G network to indicate that the UE 200 intends to switch to the NR SA cell supporting sub-6 GHz frequencies. This can lead to the 5G network, at step 506, triggering a handover.

Initially, the UE 200 attempts to detect a neighboring NR SA cell supporting UHB frequencies. If the UE 200 is able to detect the neighboring NR SA cell supporting UHB frequencies, the UE 200 can camp on the camp on the neighboring NR SA cell supporting UHB frequencies. On the other hand, if the UE 200 is not able to detect the neighboring NR SA cell supporting UHB frequencies, the UE 200 may attempt to detect a neighboring NR SA cell supporting HB frequencies. If the UE 200 is able to detect the neighboring NR SA cell supporting HB frequencies, the UE 200 can camp on the camp on the neighboring NR SA cell supporting HB frequencies. On the other hand, if the UE 200 is not able to detect the neighboring NR SA cell supporting HB frequencies, the UE 200 may attempt to detect a neighboring NR SA cell supporting MB frequencies. If the UE 200 is able to detect the neighboring NR SA cell supporting MB frequencies, the UE 200 can camp on the camp on the neighboring NR SA cell supporting MB frequencies.

On the other hand, if the UE 200 is not able to detect the neighboring NR SA cell supporting MB frequencies, the UE 200 may attempt to detect a neighboring NR SA cell supporting MLB frequencies. If the UE 200 is able to detect the neighboring NR SA cell supporting MLB frequencies, the UE 200 can camp on the camp on the neighboring NR SA cell supporting MLB frequencies. On the other hand, if the UE 200 is not able to detect the neighboring NR SA cell supporting MLB frequencies, the UE 200 may attempt to detect a neighboring NR SA cell supporting LB frequencies. If the UE 200 is able to detect the neighboring NR SA cell supporting LB frequencies, the UE 200 can camp on the camp on the neighboring NR SA cell supporting LB frequencies. On the other hand, if the UE 200 is not able to detect the neighboring NR SA cell supporting LB frequencies, it is understood that neighboring NR SA cells supporting sub-6 GHz frequencies is not available.

Once the UE 200 determines, at step 504, that no neighboring NR SA cell supporting sub-6 GHz frequencies is available, the method includes, at step 507, detecting a neighboring NR NSA cell. At step 508, the method includes determining whether a neighboring NR NSA cell (ENDC cell) supporting sub-6 GHz frequency is available. If the UE 200 determines that a neighboring NR NSA cell supporting sub-6 GHz frequencies is available, the method includes, at step 509, switching to the NSA mode. At step 510, the method includes enabling the UE 200 to send a B-1 measurement report, or enabling the UE 200 to send UE assistance information to the 5G network to indicate that the UE 200 intends to switch to the NR NSA cell supporting sub-6 GHz frequencies. This can lead to the 5G network triggering a handover and allow the UE 200 to camp on the neighboring NR NSA cell.

If the UE 200 determines, at step 518, that no neighboring NR NSA cell is available, the method includes, at step 511, disabling NR. At step 512, the method includes determining whether an LTE cell is available.

If handover to a NR SA cell supporting sub-6 GHz frequencies, handover to a NR NSA cell supporting sub-6 GHz frequencies, or handover to a LTE cell is successful, the UE 200 can avail 5G services through a different RF band. This can lead to the UE 200 switching to the new TX path from the current TX path and/or the UE 200 switching to the new RX path from the current RX path. Thus, the temperature of the UE 200 is controlled.

The various actions in the flowchart 500 may be performed in the order presented, in a different order, or simultaneously. Further, in some embodiments, some actions listed in FIG. 5 may be omitted.

The embodiments disclosed herein can be implemented through at least one software program running on at least one hardware device and performing network management functions to control the network elements. The network elements shown in FIG. 2 include blocks which can be at least one of a hardware device, or a combination of hardware device and software module.

The embodiments disclosed herein describe methods and systems for controlling the temperature of a 5G UE contributed by overheating of TX and/or RX paths of the 5G UE. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in example Very high speed integrated circuit Hardware Description Language (VHDL), or any other programming language, or implemented by one or more VHDL or several software modules being executed on at least one hardware device. The hardware device can be any kind of portable device that can be programmed. The device may also include means, which could be, for example, a hardware means, for example, an Application-specific Integrated Circuit (ASIC), or a combination of hardware and software means, for example, an ASIC and a Field Programmable Gate Array (FPGA), or at least one microprocessor and at least one memory with software modules located therein. The method embodiments described herein could be implemented partly in hardware and partly in software. Alternatively, the present disclosure may be implemented on different hardware devices, e.g., using a plurality of Central Processing Units (CPUs).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for controlling a temperature of a user equipment (UE), the method comprising:
    detecting, by the UE, at least one of a first transmitter (TX) path of the UE or a first receiver (RX) path of the UE when a temperature of the UE is greater than a predefined temperature threshold;
    determining, by the UE, whether an alternative frequency band is available in a neighbor cell based on the temperature of the UE;
    sending, by the UE to a wireless network, a modified measurement report indicating a reference signal received power (RSRP) of a serving cell that hosts a frequency band corresponding to first TX path or the first RX path based on a determination that the alternative frequency band is available in the neighbor cell, wherein the indicated RSRP of the serving cell is lower than a measured RSRP of the serving cell;
    sending, by the UE to the wireless network, a modified UE assistance information message indicating that the UE intends to switch to a cell that hosts the frequency band corresponding to a second TX path of the UE or a second RX path of the UE based on a determination that the alternative frequency band is unavailable in the neighbor cell;
    receiving, by the UE from the wireless network, a handover command based on the modified measurement report or the modified UE assistance information message; and
    performing, by the UE, at least one of a switching operation from the first TX path to the second TX path or a switching operation from the first RX path to the second RX path.

2. The method of claim 1,
    wherein the first TX path of the UE and the second TX path of the UE are identified on either a same frequency band or different frequency bands,
    wherein the first RX path of the UE and the second RX path of the UE are identified on either a same frequency band or different frequency bands,
    wherein the first TX path of the UE associated with the temperature of the UE is detected based on at least one of an uplink (UL) throughput, an UL buffer status, or a UL transmit power, and
    wherein the first RX path of the UE associated with the temperature of the UE is detected based on at least one of a downlink (DL) throughput, a DL buffer status, a number of DL retransmissions, or a DL transmit power.

3. The method of claim 1, wherein an RSRP of the cell is greater than a predefined threshold strength.

4. The method of claim 1, wherein the switching operation from the first TX path of the UE to the second TX path of the UE is performed when a handover procedure that is initiated by the wireless network in response to sending one of the modified measurement report or the modified UE assistance information message is performed.

5. The method of claim 1,
wherein the cell is selected from a plurality of cells based on a category of each of the plurality of cells,
wherein the cell hosts the frequency band corresponding to the second TX path,
wherein the category of each of the plurality of cells that is available to the UE comprises one of a new radio (NR) standalone (SA) cell, a NR non-SA (NSA) cell, a long term evolution (LTE) cell, or the serving cell, and
wherein a priority is assigned to the SA cell, the NSA cell, the LTE cell, and the serving cell in a priority order.

6. The method of claim 5,
wherein the modified measurement report comprises a B-1 measurement report, and
wherein the cell comprises the NSA cell, and
wherein the cell hosts the frequency band corresponding to the second TX path.

7. The method of claim 5,
wherein the serving cell hosts the frequency band corresponding to first TX path,
wherein the cell comprises an SA cell supporting one of lower band (LB) frequencies, mid-LB (MLB) frequencies, mid-band (MB) frequencies, higher band (HB) frequencies, or ultra-HB (UHB) frequencies, and
wherein the cell hosts the frequency band corresponding to the second TX path.

8. The method of claim 7, wherein a priority is assigned to the SA cell supporting the UHB frequencies, the SA cell supporting the HB frequencies, the SA cell supporting the MB frequencies, the SA cell supporting the MLB frequencies, and the SA cell supporting the LB frequencies in a priority order.

9. The method of claim 1, wherein the switching operation from the first RX path of the UE to the second RX path of the UE is performed when a handover procedure that is initiated by the wireless network in response to sending one of the modified measurement report or the modified UE assistance information message is performed.

10. The method of claim 1,
wherein the cell is selected from a plurality of cells based on a category of each of the plurality of cells,
wherein the cell hosts the frequency band corresponding to the second RX path,
wherein the category of each of the plurality of cells that is available to the UE comprises one of an SA cell, an NSA cell, an LTE cell, or the serving cell, and
wherein a priority is assigned to the SA cell, the NSA cell, the LTE cell, and the serving cell in a priority order.

11. The method of claim 10,
wherein the modified measurement report comprises a B-1 measurement report,
wherein the cell comprises an NSA cell, and
the cell hosts the frequency band corresponding to the second RX path.

12. The method of claim 10,
wherein the serving cell hosts the frequency band corresponding to first RX path,
wherein the cell comprises an SA cell supporting one of LB frequencies, MLB frequencies, MB frequencies, HB frequencies, or UHB frequencies, and
wherein the cell hosts the frequency band corresponding to the second RX path.

13. The method of claim 12, wherein a priority is assigned to the SA cell supporting the UHB frequencies, the SA cell supporting the HB frequencies, the SA cell supporting the MB frequencies, the SA cell supporting the MLB frequencies, and the SA cell supporting the LB frequencies in a priority order.

14. A user equipment (UE) for controlling a temperature of the UE, the UE comprising:
transmitter (TX) paths comprising a first TX path and a second TX path;
receiver (RX) paths comprising a first RX path and a second RX path; and
a processor operably coupled to the TX paths and the RX paths, the processor configured to:
detect at least one of a first transmitter (TX) path of the UE and a first receiver (RX) path of the UE when the temperature of the UE is greater than a predefined temperature threshold;
determine whether an alternative frequency band is available in a neighbor cell based on the temperature of the UE;
send, to a wireless network, a modified measurement report indicating a reference signal received power (RSRP) of a serving cell that hosts a frequency band corresponding to first TX path or the first RX path based on a determination that the alternative frequency band is available in the neighbor cell, wherein the indicated RSRP of the serving cell is lower than a measured RSRP of the serving cell;
send, to the wireless network, a modified UE assistance information message indicating that the UE intends to switch to a cell that hosts the frequency band corresponding to a second TX path of the UE or a second RX path of the UE based on a determination that the alternative frequency band is unavailable in the neighbor cell;
receive, from the wireless network, a handover command based on the modified measurement report or the modified UE assistance information message; and
perform at least one of a switching operation from the first TX path to the second TX path and a switching operation from the first RX path to the second RX path.

15. The UE of claim 14,
wherein the first TX path of the UE and the second TX path of the UE are identified on either a same frequency band or different frequency bands,
wherein the first RX path of the UE and the second RX path of the UE are identified on either a same frequency band or different frequency bands,
wherein the first TX path of the UE associated with the temperature of the UE is detected based on at least one of an uplink (UL) throughput, an UL buffer status, or a UL transmit power, and
wherein the first RX path of the UE associated with the temperature of the UE is detected based on at least one of a downlink (DL) throughput, a DL buffer status, a number of DL retransmissions, or a DL transmit power.

16. The UE of claim 14, wherein an RSRP of the cell is greater than a predefined threshold strength.

17. The UE of claim 14, wherein the switching operation from the first TX path of the UE to the second TX path of the UE or the switching operation from the first RX path of the UE to the second RX path of the UE is performed when a handover procedure that is initiated by the wireless network in response to sending one of the modified measurement report or the modified UE assistance information message is performed, wherein the cell is selected from a plurality of cells based on a category of each of the plurality of cells, wherein the cell hosts the frequency band corresponding to the second TX path of the UE or the second RX path of the UE, wherein the category of each of the plurality of cells that is available to the UE comprises one of a new radio (NR) standalone (SA) cell, a NR non-SA (NSA) cell, a long term evolution (LTE) cell, or the serving cell, and wherein a priority is assigned to the SA cell, the NSA cell, the LTE cell, and the serving cell in a priority order.

18. The UE of claim 17, wherein the modified measurement report comprises a B-1 measurement report, wherein the cell comprises an NSA cell, and wherein the cell hosts the frequency band corresponding to the second TX path.

19. The UE of claim 17, wherein the serving cell hosts the frequency band corresponding to first TX, wherein the cell or the second TX path of the UE comprises an SA cell supporting one of lower band (LB) frequencies, mid-LB (MLB) frequencies, mid-band (MB) frequencies, higher band (HB) frequencies, and ultra-HB (UHB) frequencies, wherein the cell hosts the frequency band corresponding to the second TX path, and wherein a priority is assigned to the SA cell supporting the UHB frequencies, the SA cell supporting the HB frequencies, the SA cell supporting the MB frequencies, the SA cell supporting the MLB frequencies, and the SA cell supporting the LB frequencies in a priority order.

* * * * *